United States Patent
Shah et al.

(10) Patent No.: US 10,025,698 B2
(45) Date of Patent: Jul. 17, 2018

(54) SYSTEM AND METHOD FOR EFFICIENTLY PREDICTING TESTING SCHEDULE AND STABILITY OF APPLICATIONS

(71) Applicant: Cognizant Technology Solutions India Pvt. Ltd., Chennai (IN)

(72) Inventors: Ankur Shah, Ellington, CT (US); Sivasankaravel Muthusamy, Dayton, OH (US); Krishnamoorthy Ramakrishna, Chennai (IN)

(73) Assignee: COGNIZANT TECHNOLOGY SOLUTIONS INDIA PVT. LTD, Chennai (IN)

(*) Notice: Subject to any disclaimer, the term of this patent is extended or adjusted under 35 U.S.C. 154(b) by 0 days.

(21) Appl. No.: 15/044,443

(22) Filed: Feb. 16, 2016

(65) Prior Publication Data

US 2017/0139820 A1 May 18, 2017

(30) Foreign Application Priority Data

Nov. 16, 2015 (IN) .......................... 6171/CHE/2015

(51) Int. Cl.
*G06F 9/44* (2018.01)
*G06F 11/36* (2006.01)
*G06Q 10/06* (2012.01)

(52) U.S. Cl.
CPC ..... *G06F 11/3688* (2013.01); *G06Q 10/0635* (2013.01)

(58) Field of Classification Search
CPC .................................................. G06F 11/3688
USPC .................................................. 717/101, 124
See application file for complete search history.

(56) References Cited

U.S. PATENT DOCUMENTS

| | | | | |
|---|---|---|---|---|
| 6,473,794 B1* | 10/2002 | Guheen | .................. | H04L 41/22 709/223 |
| 7,315,826 B1* | 1/2008 | Guheen | ............... | G06F 17/3089 703/27 |
| 7,747,987 B1* | 6/2010 | Akarte | ................ | G06F 11/3612 702/179 |

(Continued)

OTHER PUBLICATIONS

Defect Prediction Model, EuroSTAR Software Testing, Internet: URL: https://conference.eurostarsoftwaretesting.com, Dated: Jan. 19, 2016.

(Continued)

*Primary Examiner* — Chameli Das
(74) *Attorney, Agent, or Firm* — Cantor Colburn LLP

(57) ABSTRACT

A system and computer-implemented method for efficiently predicting software testing schedule of one or more applications is provided. The system comprises a user interface configured to facilitate creating a base execution plan for software testing of an application and receive values of one or more factors affecting test execution. The system further comprises a test management tool interface configured to receive data related to test execution from one or more test management tools. Furthermore, the system comprises a schedule prediction module configured to analyze the received values of one or more factors affecting test execution and further configured to modify the created base execution plan based on the received data related to test execution and the analyzed values of the one or more factors affecting test execution to generate one or more modified execution schedules.

17 Claims, 12 Drawing Sheets

(56) References Cited

U.S. PATENT DOCUMENTS

| | | | | |
|---|---|---|---|---|
| 2001/0052108 A1* | 12/2001 | Bowman-Amuah | G06Q 10/06 | 717/100 |
| 2005/0166094 A1* | 7/2005 | Blackwell | G06F 11/3664 | 714/38.14 |
| 2006/0174162 A1* | 8/2006 | Varadarajan | G06F 11/263 | 714/38.14 |
| 2009/0276190 A1* | 11/2009 | Bell, Jr. | G01R 31/318357 | 703/1 |
| 2010/0121809 A1 | 5/2010 | Holz | | |
| 2013/0019242 A1* | 1/2013 | Chen | H04L 41/145 | 718/1 |
| 2013/0152047 A1* | 6/2013 | Moorthi | G06F 11/368 | 717/124 |
| 2013/0174128 A1* | 7/2013 | Kansal | G06F 11/3062 | 717/135 |
| 2013/0246853 A1* | 9/2013 | Salame | G06F 11/079 | 714/37 |
| 2013/0311820 A1 | 11/2013 | Dunne | | |
| 2014/0089887 A1* | 3/2014 | Bhattacharyya | G06Q 10/06 | 717/102 |
| 2014/0215269 A1* | 7/2014 | Sung | G06F 11/261 | 714/28 |
| 2014/0236660 A1* | 8/2014 | Cantor | G06Q 10/0633 | 705/7.23 |
| 2015/0067646 A1 | 3/2015 | Singhal | | |
| 2015/0082281 A1* | 3/2015 | Koenig | G06F 11/3668 | 717/124 |
| 2015/0193228 A1* | 7/2015 | Akbulut | G06F 8/70 | 717/120 |
| 2015/0331779 A1* | 11/2015 | Subramaniam | G06F 11/3688 | 717/124 |
| 2016/0026915 A1* | 1/2016 | Delp | G05B 23/0229 | 706/20 |
| 2016/0055076 A1* | 2/2016 | Fliek | G06F 11/3672 | 717/125 |
| 2016/0117239 A1* | 4/2016 | Hamilton, II | G06F 11/3684 | 717/124 |
| 2016/0132425 A1* | 5/2016 | Bassin | G06Q 10/00 | 717/101 |

OTHER PUBLICATIONS

IT-3—Improved Method for Predicting Software Effort and Schedule, ICEAA 2014 Professional Development & Training Workshop, Jun. 11, 2014.

Muhammad Dhiauddin Mohamed Suffian, "A Prediction Model for Functional Defects in System Testing using Six Sigma", ARPN Journal of Systems and Software, vol. 1 No. 6, Sep. 2011, URL: http://www.scientific-journals.org.

R. Torkar, N. M. Awan, A. K. Alvi and W. Afzal, "Predicting software test effort in iterative development using a dynamic Bayesian network", Blekinge Institute of Technology, 2010.

* cited by examiner

QUALITY INTELLIGENCE

Logged in as Administrator

Dashboard

Administration

Projects
- Releases & Cycles Data
- Target Value Config
- Execution Data Update

Analysis & Reports

Releases & Cycles Data (Cycle level configuration)

Home > Releases & Cycles Data

Retirements | SSACI – Phase 2 | Aug Release

+ Add Cycle 10 records

Search:

| Cycle Name | Start Date | End Date | Availability | Edit | Delete |
|---|---|---|---|---|---|
| Cycle1 | 03/08/2015 | 31/08/2015 | AQI.Exped | Edit | Delete |
| Cycle2 | 04/08/2015 | 27/08/2015 | AQI.Exped | Edit | Delete |
| Cycletest | 05/08/2015 | 12/08/2015 | AQI.Exped | Edit | Delete |

Showing 1 to 3 of 3 entries

Execution Data Update

Home > Execution Data Update

| Retirements | | SSACI – Phase 2 | | Aug Release | | Cycle 1 | |
|---|---|---|---|---|---|---|---|

Plan Update | Data Entry 10 records

Search:

| Id | Date | Planned Resources | Productivity | Planned Test Cases | Planned Burn rate |
|---|---|---|---|---|---|
| 815735 | 8/6/2015 | 10.00 | 12 | 120.00 | 2020.00 |
| 815736 | 8/7/2015 | 10.00 | 12 | 120.00 | 1900.00 |
| 815737 | 8/8/2015 | 0.00 | 12 | 0.00 | 1900.00 |
| 815738 | 8/9/2015 | 0.00 | 12 | 0.00 | 1900.00 |
| 815739 | 8/10/2015 | 10.00 | 12 | 120.00 | 1780.00 |
| 815740 | 8/11/2015 | 10.00 | 12 | 120.00 | 1660.00 |
| 815741 | 8/12/2015 | 10.00 | 12 | 120.00 | 1540.00 |
| 815742 | 8/13/2015 | 10.00 | 12 | 120.00 | 1420.00 |
| 815743 | 8/14/2015 | 10.00 | 12 | 120.00 | 1300.00 |
| 815744 | 8/15/2015 | 0.00 | 12 | 0.00 | 1300.00 |

Showing 1 to 10 of 26 entries

Execution Data Update

Home > Execution Data Update

| Retirements | | SSACI – Phase 2 | | Aug Release | | Cycle 1 | |

Plan Update | Data Entry 10 records   Search:

| Date | Actual Code Drop Test Cases | Change Request Test Cases | Environment Outage | | Application Downtime | | Application Slow Res | |
|---|---|---|---|---|---|---|---|---|
| | | | Lost Hrs | Test Cases | Lost Hrs | Test Cases | Lost Hrs | Test Cas |
| 8/3/2015 | 250 | 0 | 0 | 0 | 0 | 0 | 0 | 0 |
| 8/4/2015 | 0 | 0 | 5.00 | 75 | 0 | 0 | 0 | 0 |
| 8/5/2015 | 0 | 0 | 0 | 0 | 0 | 0 | 0 | 0 |
| 8/6/2015 | 0 | 0 | 0 | 0 | 0 | 0 | 0 | 0 |
| 8/7/2015 | 0 | 0 | 0 | 0 | 0 | 0 | 0 | 0 |

Showing 1 to 5 of 29 entries

< 1 2 3 4 5 6 >

Dashboard
Administration
Projects
- Releases & Cycles Data
- Target Value Config
- Execution Data Update
- Analysis & Reports

FIG. 1D

◇ Readiness  ✓ ✗  ░ Schedule Deviation & Cost Impact (AS IS)  ✓ ✗

Cycle1 – AS IS & Predicted Scenarios

| 10 | records | | | | Search: |
|---|---|---|---|---|---|

| Scenario | AS-IS | Low Failure | Reduction in scope | reduinscope |
|---|---|---|---|---|
| Revised Failure (%) | 29.00 | 15.00 | 29.00 | 29.00 |
| Anticipated Outage(%) | 21.00 | 10.00 | 21.00 | 21.00 |
| Revised Productivity | 12.00 | 12.00 | 12.00 | 12.00 |
| Reduction in Scope | 0.00 | 0.00 | 150.00 | 450.00 |
| Schedule Extension Model | 9/8/2015 | 9/2/2015 | 9/4/2015 | 8/31/2015 |
| Effort Prediction Model | 8/31/2015 | 8/31/2015 | 8/31/2015 | 8/31/2015 |
| Additional Effort (PHrs) | 798 | 104 | 464 | 0 |
| Cost Impact | $ 7180.00 | $ 936.66 | $ 4180.00 | $ 0.00 |
| View | | | | |

Showing 1 to 4 of 4 entries                    ‹ 1 ›

FIG. 1G

| Operational Unit | Project | Release | Cycle | System Stability (%) | Risk (%) | Planned End Date | Predicted End Date | $ Cost Impact |
|---|---|---|---|---|---|---|---|---|
| Retirements | SSACI – Phase 2 | Aug Release | Cycletest | 0 | 100 | 8/12/2015 | 8/12/2015 | $ 0.00 |
| Retirements | SSACI – Phase 2 | Aug Release | Cycle1 | 42.00 | 58.00 | 8/31/2015 | 8/31/2015 | $ 0.00 |
| Retirements | SSACI – Phase 2 | Aug Release | Cycle2 | 92.00 | 8.00 | 8/27/2015 | 8/27/2015 | $ 0.00 |

Showing 1 to 3 of 3 entries

Schedule Deviation & Cost Impact (AS IS)

Stability by Business Functions

| Business Importance | Functionality | System Stability (%) | Risk (%) | TCF (%) | TSF (%) | OCDF (%) | OHDF (%) | OMDF (%) | Failed TC Risk (%) |
|---|---|---|---|---|---|---|---|---|---|
| 10.00 | Functional | 42.00 | 42.00 | 1.5 | 10.7 | 6.1 | 4.6 | 6.1 | 29.0 |

Showing 1 to 1 of 1 entries

FIG. 1H

SYSTEM AND METHOD FOR EFFICIENTLY PREDICTING TESTING SCHEDULE AND STABILITY OF APPLICATIONS

CROSS REFERENCE TO RELATED APPLICATION

This application is related to and claims the benefit of Indian Patent Application Number 6171/CHE/2015 filed on Nov. 16, 2015, the contents of which are herein incorporated by reference in their entirety.

FIELD OF THE INVENTION

The present invention relates generally to software testing of applications. More particularly, the present invention provides a system and method for efficiently predicting software testing schedule and stability of applications.

BACKGROUND OF THE INVENTION

Software testing and Quality Assurance (QA) is a cumbersome process during any Software Development Life Cycle (SDLC). Software testing and QA are dependent on testing schedule. Efficient software testing schedules save considerable time and cost for organizations developing new software's and applications. Further, efficient software testing schedules and QA ensures stability of deployed applications.

Conventionally, various systems and methods exist for predicting software testing schedule and stability of applications. For example, software test management tools exist that facilitate scheduling test execution. However, most of these software test management tools provide metrics only on test executions and defects. The above mentioned software test management tools do not take into consideration SDLC factors like delayed code drop, application downtime, environment downtime, scope changes and retesting due to defects that impact test execution at all or consider some of them in isolation. Usually, impact of the above-mentioned factors is assumed while planning test execution by the test leads/test managers. Manually assuming the impact of these factors on software testing schedule is cumbersome. Further, these factors are dynamic therefore monitoring and tracking these factors manually and accurately predicting their impact on software testing schedule on a day to day basis is even more cumbersome and often impossible. This results in inefficient testing schedule thereby causing delay, higher costs and inadequate testing. Also, applications deployed after inadequate testing are not stable and prone to post production defects.

In light of the above mentioned disadvantages, there is a need for a system and method for efficiently predicting testing schedule and stability of applications. Further, there is a need for a system and method for predicting software testing schedule by monitoring and tracking one or more SDLC factors during various stages of testing. Furthermore, there is a need for a system and method capable of simulating different scenarios to determine impact on software testing schedule, cost, resources, stability and risk. In addition, there is a need for a system and method for calculating overall stability and risk of an application and stability/risk of one or more features of the application during various stages of testing.

SUMMARY OF THE INVENTION

A system, computer-implemented method and computer program product for efficiently predicting software testing schedule of one or more applications is provided. The system comprises a user interface configured to facilitate creating a base execution plan for software testing of an application and receive values of one or more factors affecting test execution. The system further comprises a test management tool interface configured to receive data related to test execution from one or more test management tools. Furthermore, the system comprises a schedule prediction module configured to analyze the received values of one or more factors affecting test execution and further configured to modify the created base execution plan based on the received data related to test execution and the analyzed values of the one or more factors affecting test execution to generate one or more modified execution schedules.

In an embodiment of the present invention, the system further comprises a stability module configured to determine stability of the application during testing using the received data related to test execution. In an embodiment of the present invention, the system further comprises a reporting module configured to generate a graphical representation illustrating deviations of the one or more generated modified execution plans with respect to the base execution plan.

In an embodiment of the present invention, the schedule prediction module is further configured to provide one or more options to one or more users to modify the values of the one or more factors impacting test execution and generating modified execution schedules corresponding to the modified values of the one or more factors. In an embodiment of the present invention, creating the base execution plan comprises providing information corresponding to the base execution plan and further wherein the information corresponding to the base execution plan comprises: testing cycles for a project, start date and end date of testing cycles, number of planned resources, number of hours, planned test cases, planned cost and planned burn rate for each of the one or more testing cycles. In an embodiment of the present invention, the one or more factors affecting test execution comprise at least: environment downtime, application downtime, delayed code drop, scope changes, defects and retesting. In an embodiment of the present invention, the data related to test execution received from the one or more test management tools comprise at least: number of executed cases, number of passed test cases, number of failed test cases, backlog of test cases, number of test cases awaiting execution and information related to defects. In an embodiment of the present invention, the one or more modified execution schedules have associated one or more metrics comprising at least one of: cost, productivity, burn rate and resources. In an embodiment of the present invention, the schedule prediction module generates the one or more modified execution schedules for adhering to the base execution schedule by increasing number of resources and productivity based on the analyzed values of the one or more factors affecting test execution.

The computer-implemented method for efficiently predicting software testing schedule of one or more applications, via program instructions stored in a memory and executed by a processor, comprises creating a base execution plan for software testing of an application. The computer-implemented method further comprises receiving and analyzing values of one or more factors affecting test execution. Furthermore, the computer-implemented method comprises receiving data related to test execution from one or more test management tools. In addition, the computer-implemented method comprises modifying the created base execution plan based on the received data related to test execution and the analyzed values of the one or more factors affecting test execution to generate one or more modified execution plans.

In an embodiment of the present invention, the computer-implemented method further comprises the step of determining stability of the application during testing using the received data related to test execution. In an embodiment of the present invention, the computer-implemented method further comprises the step of generating a graphical representation illustrating deviations of the one or more generated modified execution plans with respect to the base execution plan. In an embodiment of the present invention, the computer-implemented method further comprises step of providing one or more options to one or more users to modify the values of the one or more factors affecting test execution and generating modified execution schedules corresponding to the modified values of the one or more factors.

The computer program product for efficiently predicting software testing schedule of one or more applications comprises a non-transitory computer-readable medium having computer-readable program code stored thereon, the computer-readable program code comprising instructions that when executed by a processor, cause the processor to create a base execution plan for software testing of an application. The processor further receives and analyzes values of one or more factors affecting test execution. Furthermore, the processor receives data related to test execution from one or more test management tools. In addition, the processor modifies the created base execution plan based on the received data related to test execution and the analyzed values of the one or more factors affecting test execution to generate one or more modified execution plans.

BRIEF DESCRIPTION OF THE ACCOMPANYING DRAWINGS

The present invention is described by way of embodiments illustrated in the accompanying drawings wherein:

FIG. 1B is a screenshot illustrating a list of testing cycles corresponding to a release/project, in accordance with an exemplary embodiment of the present invention;

FIG. 1C is a screenshot of base execution plan update screen for a testing cycle, in accordance with an embodiment of the present invention;

FIG. 1D is a screenshot illustrating updating of factors impacting test execution of a testing cycle, in accordance with an embodiment of the present invention;

FIG. 1G is a screenshot depicting metrics associated with execution schedules corresponding to one or more simulated scenarios, in accordance with an exemplary embodiment of the present invention;

FIG. 1H is a screenshot of a list of all projects along with their system stability percentage, planned end date, predicted end date and cost impact, in accordance with an exemplary embodiment of the present invention;

DETAILED DESCRIPTION OF THE INVENTION

A system and method for efficiently predicting software testing schedule and stability of applications is described herein. The invention provides for a system and method for accurately predicting testing schedule by monitoring and tracking one or more Software Development Lifecycle (SDLC) factors during various stages of testing. The invention further provides for a system and method capable of simulating different scenarios to determine impact on testing schedule, cost and resources. Furthermore, the invention provides for a system and method for calculating stability and risk of an application and stability and risk of one or more features of the application during various stages of testing.

The following disclosure is provided in order to enable a person having ordinary skill in the art to practice the invention. Exemplary embodiments are provided only for illustrative purposes and various modifications will be readily apparent to persons skilled in the art. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

The present invention would now be discussed in context of embodiments as illustrated in the accompanying drawings.

Figure 1:
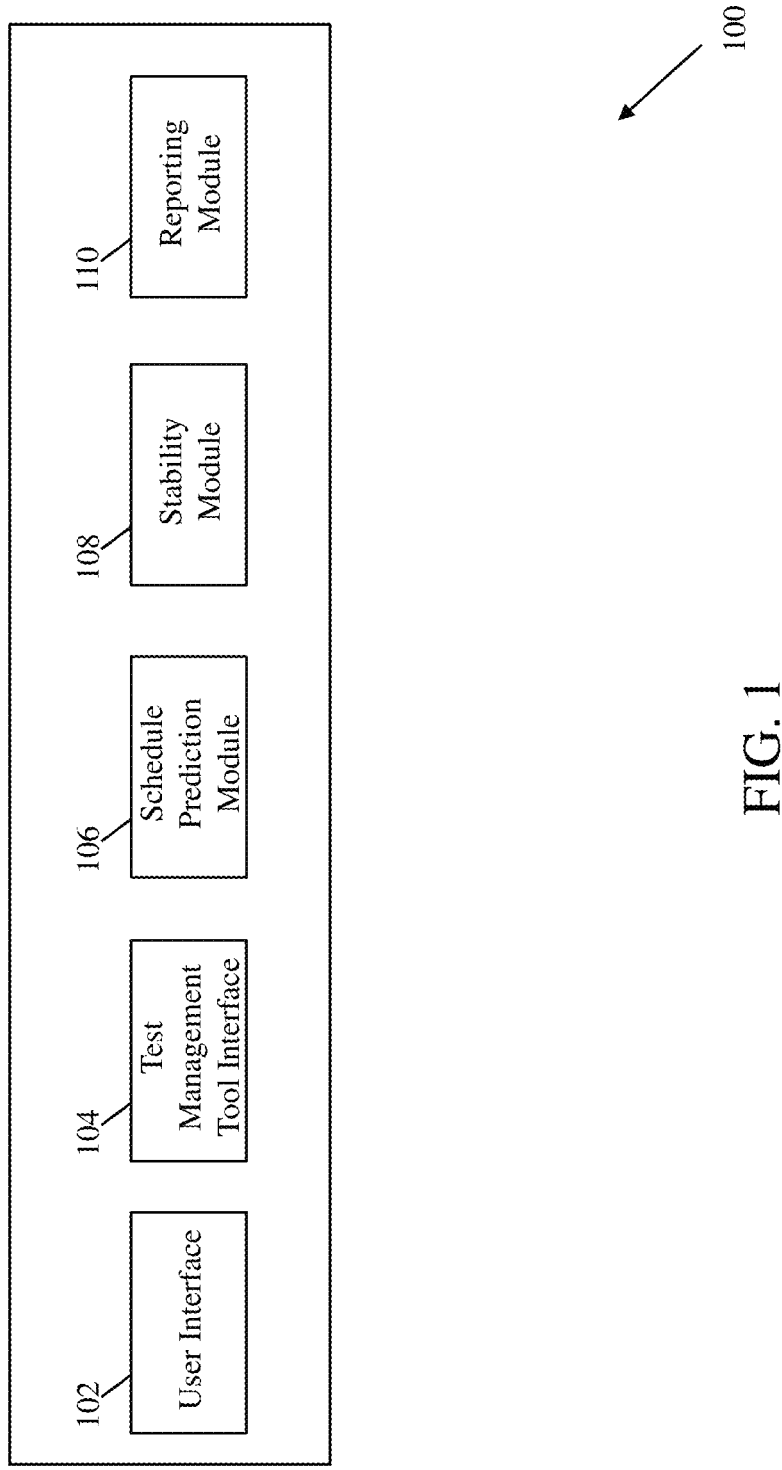
FIG. 1 is a block diagram illustrating a system for efficiently predicting software testing schedule and stability of applications, in accordance with an embodiment of the present invention.

FIG. 1 is a block diagram illustrating a system for efficiently predicting software testing schedule and stability of applications, in accordance with an embodiment of the present invention. The system 100 comprises a user interface 102, a test management tool interface 104, a schedule prediction module 106, a stability module 108 and a reporting module 110.

The user interface 102 is a front end interface configured to facilitate one or more users to access the system 100. In an embodiment of the present invention, the user interface 102 is a graphical user interface. The one or more users include, but not limited to, one or more test leads/test managers. In an embodiment of the present invention, the one or more users access the system 100 via one or more electronic communication devices communicating with the system 100 via internet for software testing. In an embodiment of the present invention, the user interface 102 is configured to provide access to the system 100 based on designation of the one or more users.

Figure 1A:
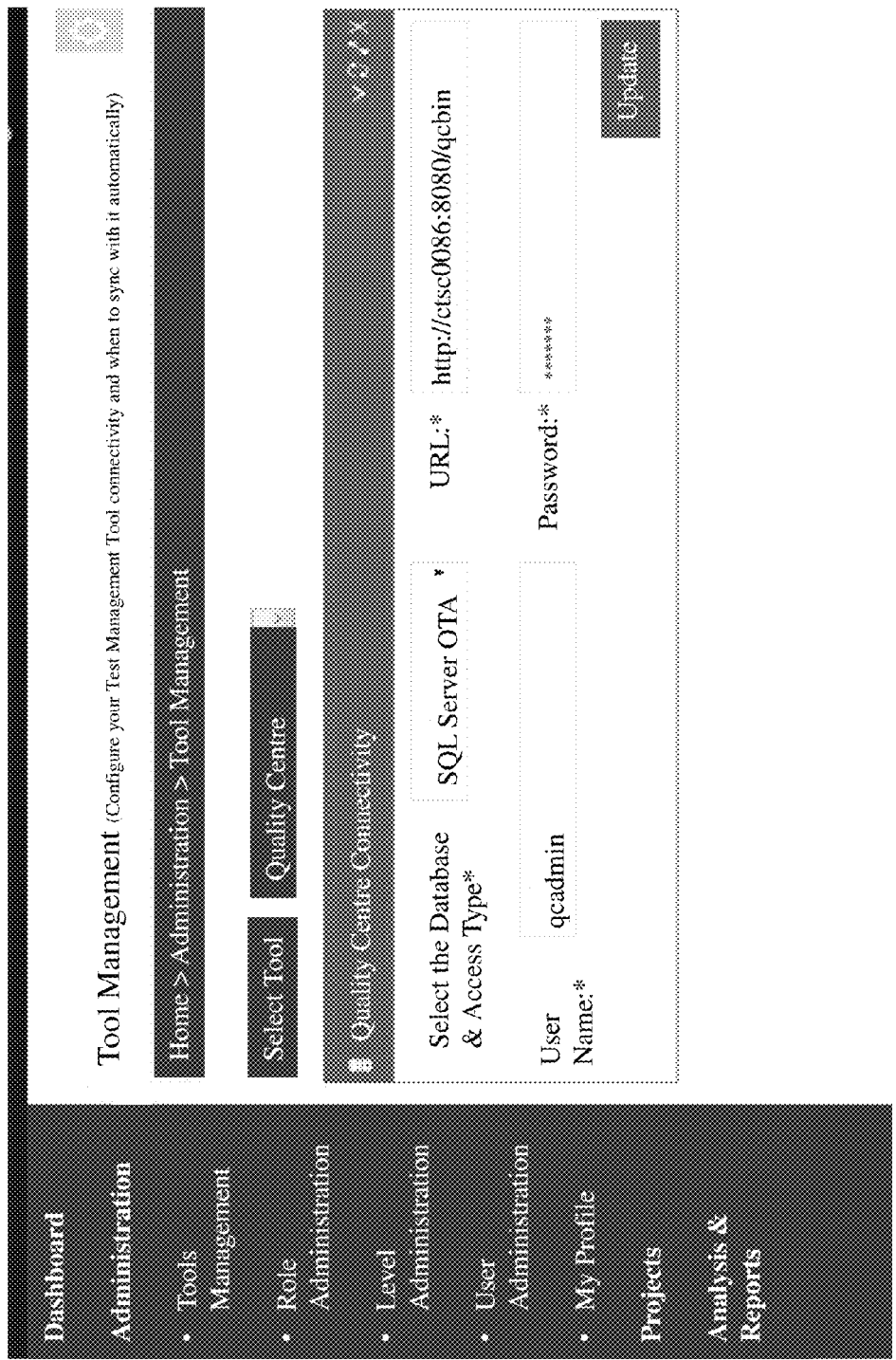
FIG. 1A is a screenshot illustrating selection of a test management tool by an administrator, in accordance with an embodiment of the present invention.

The user interface 102 provides options to the one or more users to connect one or more test management tools to the system 100. Further, the one or more users provide authentication details corresponding to the one or more test management tools for connecting. The one or more test management tools include, but not limited to, Hewlett-Packard Application Lifecycle Management (ALM), Microsoft test manager, Team Foundation Sever (TFS), Jira and any other test management tools. In an embodiment of the present invention, an administrator manages connectivity of the one or more test management tools and grant role based access rights to the one or more users. FIG. 1A is a screenshot illustrating selection of a test management tool by an administrator, in accordance with an embodiment of the present invention.

The user interface 102 further comprises various options to facilitate the one or more users to create a base execution plan of one or more releases and projects configured for testing an application in the one or more connected test management tools. Further, the one or more users provide information corresponding to the base execution plan. In an embodiment of the present invention, information corresponding to the base execution plan comprises, but not limited to, testing cycles for a project, start date and end date of testing cycles, number of planned resources, number of hours, planned test cases, planned cost and planned burn rate for each of the one or more testing cycles. FIG. 1B is a screenshot illustrating a list of testing cycles corresponding to a release/project, in accordance with an exemplary embodiment of the present invention. FIG. 1C is a screenshot of a base execution plan update screen for a testing cycle, in accordance with an embodiment of the present invention. In an embodiment of the present invention, the user interface 102 provides options to modify the base execution plan in case of any changes. Further, the user interface 102 provides options to the one or more users to update data related to test execution such as, but not limited to, hours and test cases lost due to various factors impacting test execution. FIG. 1D is a screenshot illustrating updating of factors impacting test execution of a testing cycle, in accordance with an embodiment of the present invention. In an embodiment of the present invention, the user interface 102 also provides options to the one or more users to update the base execution plan and switch to a new base execution plan when an existing base execution plan is not valid.

Once the base execution plan is received by the system 100, the system 100 prompts the one or more users to provide values of one or more factors impacting test execution. The one or more factors impacting test execution include, but not limited to, environment downtime, application downtime, delayed code drop, scope changes, defects and retesting. In an embodiment of the present invention, the values of the one or more factors impacting test execution are provided along with the base execution plan. In another embodiment of the present invention, the values of the one or more factors impacting test execution are modified by the one or more users during testing via the user interface 102.

The user interface 102 also provides one or more options to the one or more users to configure application release in the one or more test management tools for determining application stability. The one or more users also configure one or more risk and stability factors, their weightages and business importance via the user interface 102. The one or more risk and stability factors configured by the one or more users include, but not limited to, Test Coverage Factor (TCF), Test Success Factor (TSF), Outstanding Critical Defects (OCD), Outstanding High severity Defects Factor (OHDF), Outstanding Medium severity Defects Factor (OMDF) and Failed Test Cases Factor.

Once the base execution plan is received along with the values of the one or more factors impacting test execution, the control is transferred to the test management tool interface 104. The test management tool interface 104 is configured to receive data related to test execution from the connected one or more test management tools for predicting actual testing schedule. The data related to the test execution received from the one or more connected test management tools comprise, but not limited to, number of executed cases, number of passed test cases, number of failed test cases, backlog of test cases, number of test cases awaiting execution and information related to defects. In an embodiment of the present invention, data related to test execution is updated via the test management tool interface 104 daily based on the cycle start date and cycle end date.

On receiving the data related to test execution from the one or more test management tools for accurately predicting the execution schedule, the control is transferred to the schedule prediction module 106. The schedule prediction module 106 is configured to analyze the one or more factors affecting test execution to determine their impact on the base execution schedule. The schedule prediction module 106 is further configured to modify the base execution plan based on the received data related to the test execution and the one or more analyzed factors to generate one or more modified execution schedules and corresponding metrics. The metrics associated with the one or more modified execution schedules comprise, but not limited to, cost, productivity, burn rate and resources. In an exemplary embodiment of the present invention, in case of environment downtime, testing hours are adjusted so as to provide a modified execution schedule. In an embodiment of the present invention, the schedule prediction module 106 provides the one or more modified execution schedules based on one or more scenarios including, but not limited to, present, low failure, reduced scope, high outage and low outage, revised productivity, maximum resource capacity and revised end date. In an embodiment of the present invention, a modified execution schedule is generated so as to minimize testing costs. In another embodiment of the present invention, a modified execution schedule is generated in order to adhere to the base execution schedule by increasing resources and productivity in case the base execution plan is affected due to the one or more factors impacting test execution. In an embodiment of the present invention, the schedule prediction module 106 determines cost impact on the software testing associated with the one or more modified execution schedules due to each of the one or more factors impacting the test execution individually and cumulatively. The schedule prediction module 106 also determines additional resources and additional hours required to adhere to initial execution schedule.

Figure 1E:
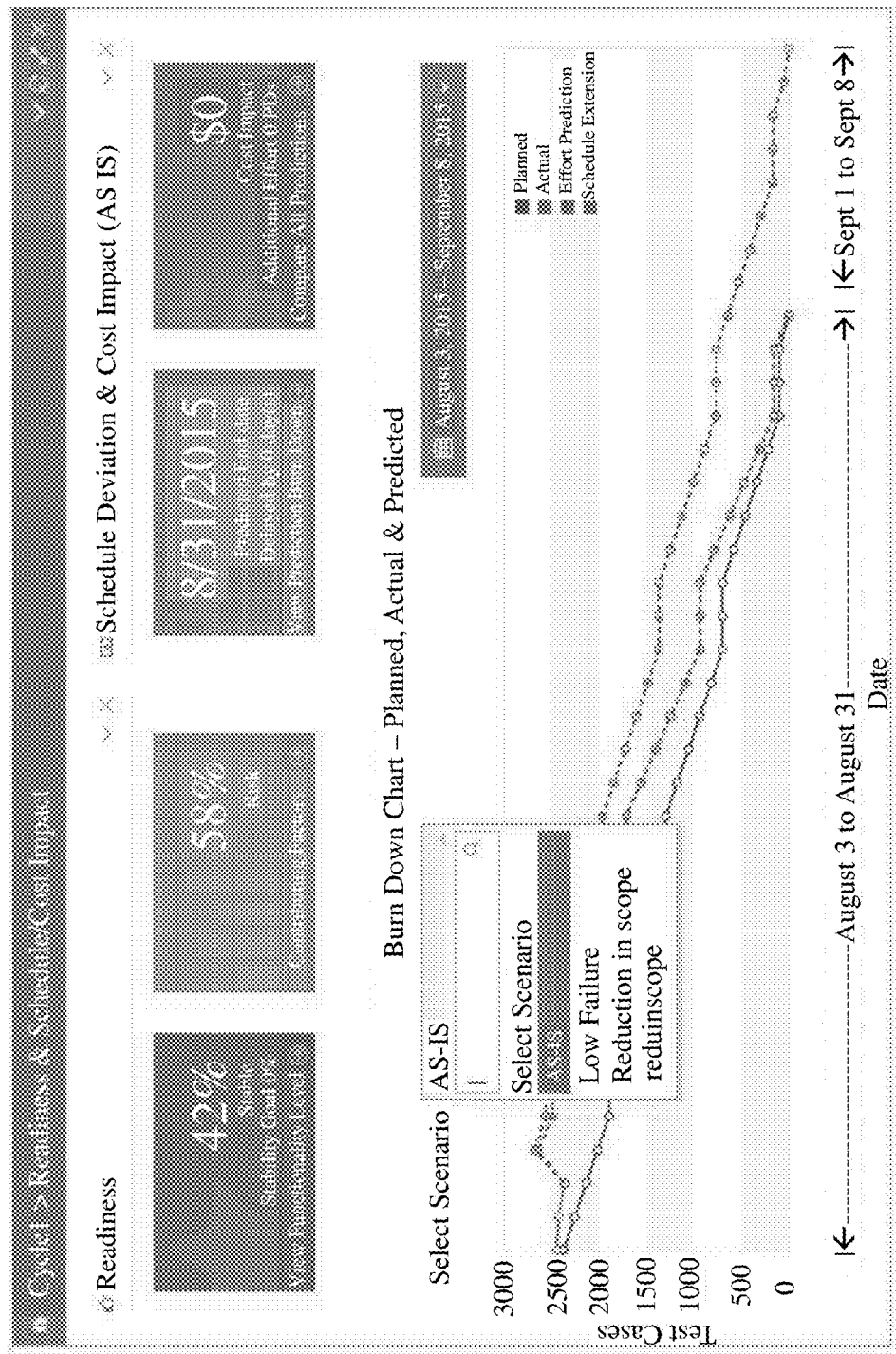
FIG. 1E is a screenshot illustrating a list of different scenarios, in accordance with an exemplary embodiment of the present invention.
Figure 1F:
FIG. 1F is a screenshot of an "AS-IS" scenario depicting burn down charts, in accordance with an exemplary embodiment of the present invention.

In an embodiment of the present invention, the schedule prediction module 106 provides options to the one or more users to provide the one or more scenarios by modifying values of the one or more factors impacting test execution and generating corresponding modified execution schedules. The one or more generated execution schedules and corresponding metrics are rendered on the one or more user interfaces 102 via the reporting module 110. In an embodiment of the present invention, the reporting module 110 generates pictorial representations including, but not limited to, scrollable timeline view illustrating deviations against the base execution plan, factors and their values impacting the test execution and comparisons between testing scenarios. FIG. 1E is a screenshot illustrating a list of scenarios, in accordance with an exemplary embodiment of the present invention. FIG. 1F is a screenshot of an "AS-IS" scenario depicting burn down charts, in accordance with an exemplary embodiment of the present invention. The "AS-IS" scenario is also referred to as "present scenario" in various sections of the specification. FIG. 1G is a screenshot depicting metrics associated with execution schedules corresponding to one or more simulated scenarios, in accordance with an exemplary embodiment of the present invention.

The stability module 108 is configured to determine application stability at any stage of testing by generating a system stability score. The system stability score is a percentage calculated based on values of the one or more stability and risk factors associated with the application. Further, the values of the one or more stability and risk factors are determined using the data related to the test execution received from the one or more connected test management tools.

In an embodiment of the present invention, the stability module 108 comprise mathematical formulas for calculating the system stability score and measuring and comparing impact of each of the one or more stability and risk factors. In an embodiment of the present invention, the key parameters considered for calculating the system/application stability score include, but not limited to, status weightage, factor weightage, risk factor and safety factor. In an embodiment of the present invention, the status weightage measures impact of each of the one or more stability and risk factors. In an embodiment of the present invention, the factor weightage is relative comparison between the one or more stability and risk factors. In an embodiment of the present invention, the risk factor is calculated by multiplying the factor weightage with the status weightage. In an embodiment of the present invention, the safety factor is calculated using the following formula: 1/risk factor. In an embodiment of the present invention, the application stability percentage is calculated using the following mathematical formula: safety factor/(safety factor+risk factor).

Figure 1I:
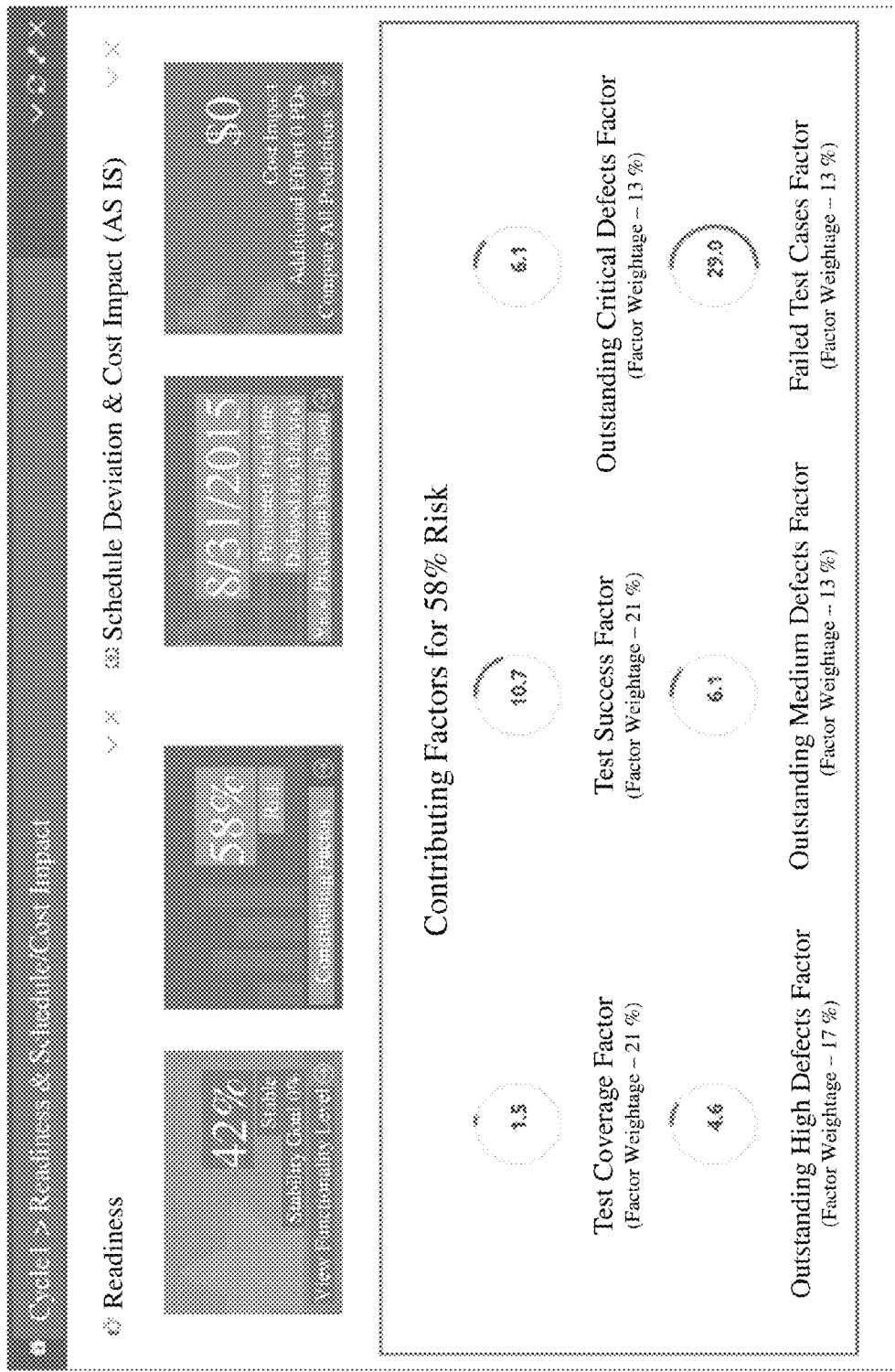
FIG. 1I is a screenshot illustrating values of risk and stability factors impacting system stability percentage, in accordance with an exemplary embodiment of the present invention.

In an embodiment of the present invention, the system stability score, weightages and the values of the one or more stability and risk factors are rendered on the user interface 102 via the reporting module 110 in a meaningful manner for use by the one or more users. In an embodiment of the present invention, the reporting module 110 generates one or more stability trend reports after each testing cycle. In another embodiment of the present invention, the reporting module 110 generates one or more application stability reports during release. In an embodiment of the present invention, the stability module 108 fetches data related to one or more business groups from the one or more test management tools via the test management tool interface 104 for generating the one or more application stability reports for each of the one or more business groups during release. FIG. 1H is a screenshot of a list of all projects along with their system stability percentage, planned end date, predicted end date and cost impact, in accordance with an exemplary embodiment of the present invention. FIG. 1I is a screenshot illustrating values of risk and stability factors impacting system stability percentage, in accordance with an exemplary embodiment of the present invention. In an embodiment of the present invention, the system 100 comprises a defect prediction module. The defect prediction module is a statistical algorithm configured to predict one or more defects in the application during release. The one or more defects are predicted based on historical data associated with defects stored in the system 100 during previous testing cycles.

Figure 2:
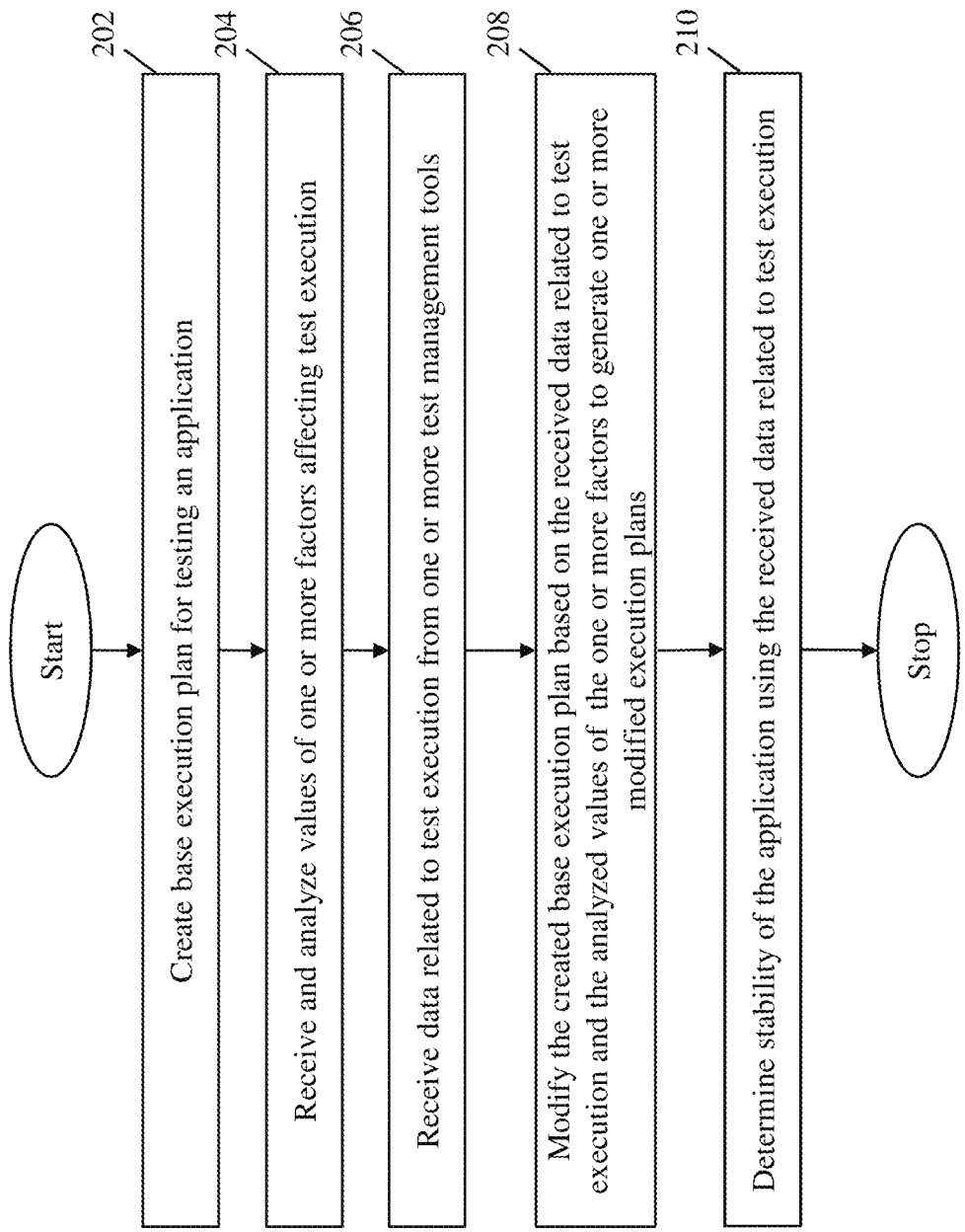
FIG. 2 is a flowchart illustrating a method for efficiently predicting testing schedule and stability of applications, in accordance with an embodiment of the present invention.

FIG. 2 is a flowchart illustrating a method for efficiently predicting software testing schedule and stability of applications, in accordance with an embodiment of the present invention.

At step 202, base execution plan for testing an application is created by one or more users. In an embodiment of the present invention, the base execution plan corresponds to one or more projects configured for testing software of an application in one or more test management tools. Further, the base execution plan comprises, but not limited to, testing cycles for a project, start date and end date of testing cycles, number of planned resources, number of hours, planned test cases, and planned cost and planned burn rate for each of the one or more testing cycles. In an embodiment of the present invention, the base execution plan is planned by the one or more users prior to testing in order to adhere to timelines and ensure timely delivery of the application under testing. In an embodiment of the present invention, the one or more users include, but not limited to, test leads/test managers.

In an embodiment of the present invention, the one or more users create base execution plan via a user interface. Further, the user interface provides one or more options to modify the base execution plan in case of any changes. The user interface also provides options to update data related to test execution such as, but not limited to, hours and test cases lost due to various factors impacting test execution.

At step 204, values of one or more factors affecting test execution are received and analyzed. In an embodiment of the present invention, the one or more users provide values of one or more factors that impact test execution. The one or more factors impacting test execution include, but not limited to, environment downtime, application downtime, delayed code drop, scope changes, defects and retesting. In an embodiment of the present invention, the values of the one or more factors impacting test execution are provided along with the base execution plan. In another embodiment of the present invention, the values of the one or more factors impacting test execution are modified by the one or more users during software testing via the user interface. In an embodiment of the present invention, the values of the one or more factors impacting test execution are modified randomly, periodically or as and when required.

In an embodiment of the present invention, the one or more users configure application release in the one or more test management tools for determining application stability. Further, the one or more users configure one or more risk and stability factors, their weightages and business importance via the user interface. The one or more risk and stability factors configured by the one or more users include, but not limited to, Test Coverage Factor (TCF), Test Success Factor (TSF), Outstanding Critical Defects (OCD), Outstanding High severity Defects Factor (OHDF), Outstanding Medium severity Defects Factor (OMDF) and Failed Test Cases Factor.

At step 206, data related to test execution is received from the one or more test management tools. The data related to the test execution received from the one or more test management tools comprise, but not limited to, number of executed cases, number of passed test cases, number of failed test cases, backlog of test cases, number of test cases awaiting execution and information related to defects.

At step 208, the base execution plan is modified based on the received data related to test execution and the analyzed values of the one or more factors to generate one or more modified execution schedules and corresponding metrics. Further, the metrics associated with the one or more generated modified execution schedules include, but not limited to, cost, productivity, burn rate and resources. In an exemplary embodiment of the present invention, in case of environment downtime, lost testing hours are adjusted so as to provide a modified execution schedule. In an embodiment of the present invention, the one or more modified execution schedules correspond to one or more scenarios including, but not limited to, present, low failure, reduced scope, high outage and low outage. In an embodiment of the present invention, generating the modified one or more execution schedules comprises determining cost impact on the software testing associated with the one or more modified execution schedules due to each of the one or more factors impacting the test execution individually and cumulatively. In an embodiment of the present invention, additional resources and additional hours required to adhere to the base execution schedule are also determined.

At step 210, stability of the application is determined using the received data related to test execution. The stability of the application is determined based on the one or more stability and risk factors configured by the one or more users. Further, the values of the one or more stability and risk factors are determined using the data related to test execution received from the one or more test management tools. In an embodiment of the present invention, a system stability score can be calculated at any point during testing to determine stability of the application at that point. The system stability score, weightage and values of stability and risk factors are rendered on the user interface in a meaningful manner for use by the one or more users.

Figure 3:
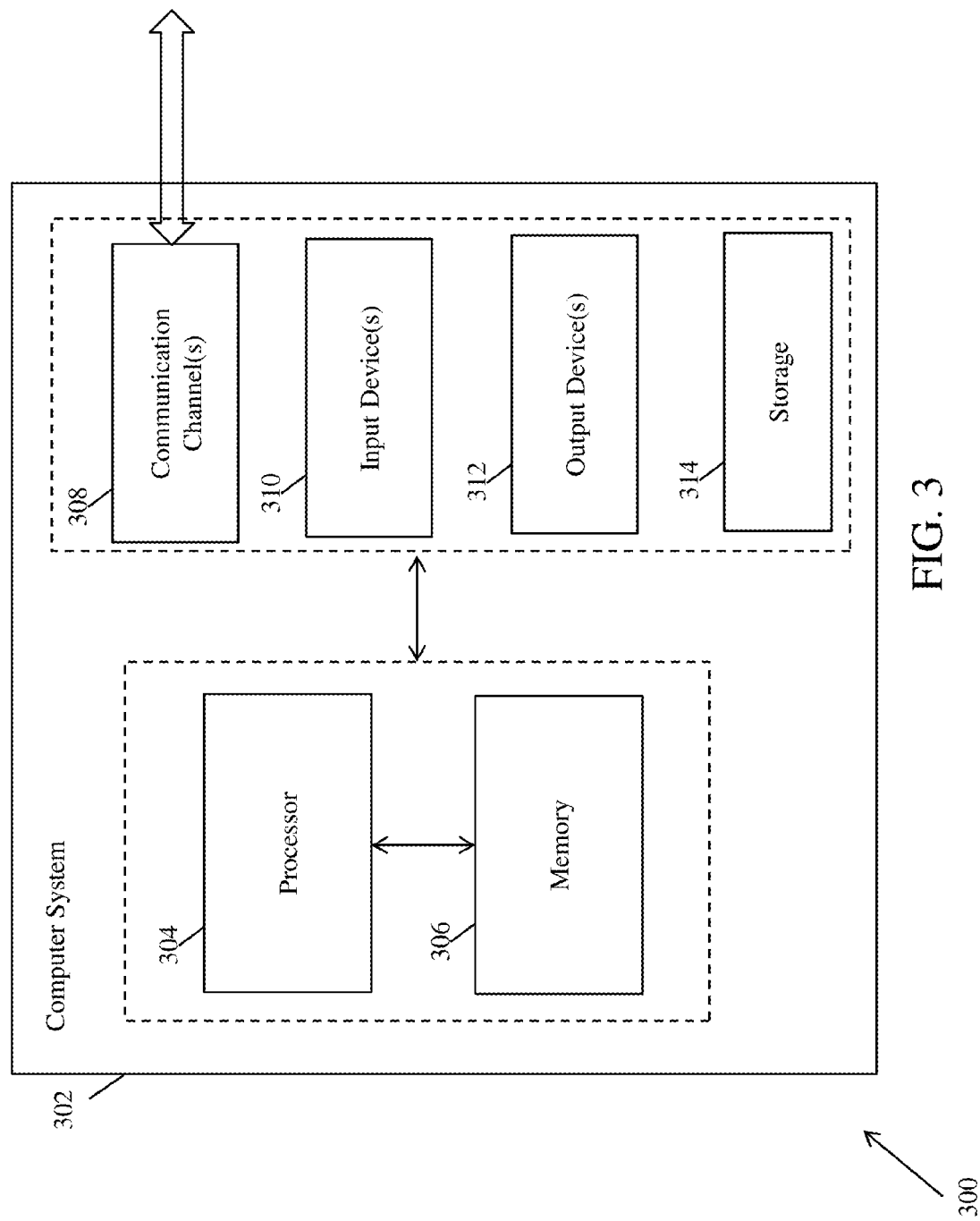
FIG. 3 illustrates an exemplary computer system for efficiently predicting testing schedule and stability of applications, in accordance with an embodiment of the present invention.

FIG. 3 illustrates an exemplary computer system for efficiently managing enterprise architecture using resource description framework, in accordance with an embodiment of the present invention.

The computer system 302 comprises a processor 304 and a memory 306. The processor 304 executes program instructions and may be a real processor. The processor 304 may also be a virtual processor. The computer system 302 is not intended to suggest any limitation as to scope of use or functionality of described embodiments. For example, the computer system 302 may include, but not limited to, a general-purpose computer, a programmed microprocessor, a micro-controller, a peripheral integrated circuit element, and other devices or arrangements of devices that are capable of implementing the steps that constitute the method of the present invention. In an embodiment of the present invention, the memory 306 may store software for implementing various embodiments of the present invention. The computer system 302 may have additional components. For example, the computer system 302 includes one or more communication channels 308, one or more input devices 310, one or more output devices 312, and storage 314. An interconnection mechanism (not shown) such as a bus, controller, or network, interconnects the components of the computer system 302. In various embodiments of the present invention, operating system software (not shown) provides an operating environment for various software's executing in the computer system 302, and manages different functionalities of the components of the computer system 302.

The communication channel(s) 308 allow communication over a communication medium to various other computing entities. The communication medium provides information such as program instructions, or other data in a communication media. The communication media includes, but not limited to, wired or wireless methodologies implemented with an electrical, optical, RF, infrared, acoustic, microwave, Bluetooth or other transmission media.

The input device(s) 310 may include, but not limited to, a keyboard, mouse, pen, joystick, trackball, a voice device, a scanning device, or any another device that is capable of providing input to the computer system 302. In an embodiment of the present invention, the input device(s) 310 may be a sound card or similar device that accepts audio input in analog or digital form. The output device(s) 312 may include, but not limited to, a user interface on CRT or LCD, printer, speaker, CD/DVD writer, or any other device that provides output from the computer system 302.

The storage 314 may include, but not limited to, magnetic disks, magnetic tapes, CD-ROMs, CD-RWs, DVDs, flash drives or any other medium which can be used to store information and can be accessed by the computer system 302. In various embodiments of the present invention, the storage 314 contains program instructions for implementing the described embodiments.

The present invention may suitably be embodied as a computer program product for use with the computer system 302. The method described herein is typically implemented as a computer program product, comprising a set of program instructions which is executed by the computer system 302 or any other similar device. The set of program instructions may be a series of computer readable codes stored on a tangible medium, such as a computer readable storage medium (storage 314), for example, diskette, CD-ROM, ROM, flash drives or hard disk, or transmittable to the computer system 302, via a modem or other interface device, over either a tangible medium, including but not limited to optical or analogue communications channel(s) 308. The implementation of the invention as a computer program product may be in an intangible form using wireless techniques, including but not limited to microwave, infrared, Bluetooth or other transmission techniques. These instructions can be preloaded into a system or recorded on a storage medium such as a CD-ROM, or made available for downloading over a network such as the internet or a mobile telephone network. The series of computer readable instructions may embody all or part of the functionality previously described herein.

The present invention may be implemented in numerous ways including as an apparatus, method, or a computer program product such as a computer readable storage medium or a computer network wherein programming instructions are communicated from a remote location.

While the exemplary embodiments of the present invention are described and illustrated herein, it will be appreciated that they are merely illustrative. It will be understood by those skilled in the art that various modifications in form and detail may be made therein without departing from or offending the spirit and scope of the invention as defined by the appended claims.

We claim:

1. A computer system for efficiently predicting software testing schedule of one or more applications, the computer system comprising a programmed microprocessor, the computer system further comprising:

a user interface configured to:

facilitate, using the programmed microprocessor, creating a base execution plan for software testing of an application; and receive, using the programmed microprocessor, values of one or more factors affecting test execution;

a test management tool interface configured to receive, using the programmed microprocessor, data related to test execution from one or more test management tools;

a schedule prediction module configured to:
- analyze, using the programmed microprocessor, the received values of one or more factors affecting test execution and further configured to modify the created base execution plan based on the received data related to test execution and the analyzed values of the one or more factors affecting test execution to generate one or more modified execution schedules; and
- simulate, using the programmed microprocessor, one or more scenarios to determine impact on cost and resources required for executing the software testing of the one or more applications; and a stability module configured to determine, using the programmed microprocessor, stability of the application at one or more stages of the testing of the application by generating a system stability score, wherein the system stability score is generated based on values of one or more stability and risk factors associated with the application;

wherein the values of the one or more stability and risk factors are determined using the data related to the test execution received from the one or more connected test management tools.

2. The computer system of claim 1 further comprising a reporting module configured to generate, using the programmed microprocessor, a graphical representation illustrating deviations of the one or more generated modified execution plans with respect to the base execution plan.

3. The computer system of claim 1, wherein the schedule prediction module is further configured to provide one or more options to one or more users to modify the values of the one or more factors impacting test execution and generating modified execution schedules corresponding to the modified values of the one or more factors.

4. The computer system of claim 1, wherein creating the base execution plan comprises providing information corresponding to the base execution plan and further wherein the information corresponding to the base execution plan comprises: testing cycles for a project, start date and end date of testing cycles, number of planned resources, number of hours, planned test cases, planned cost and planned burn rate for each of the one or more testing cycles.

5. The computer system of claim 1, wherein the one or more factors affecting test execution comprise at least: environment downtime, application downtime, delayed code drop, scope changes, defects and retesting.

6. The computer system of claim 1, wherein the data related to test execution received from the one or more test management tools comprise at least: number of executed cases, number of passed test cases, number of failed test cases, backlog of test cases, number of test cases awaiting execution and information related to defects.

7. The computer system of claim 1, wherein the one or more modified execution schedules have associated one or more metrics comprising at least one of: cost, productivity, burn rate and resources.

8. The computer system of claim 1, wherein the schedule prediction module generates the one or more modified execution schedules for adhering to the base execution schedule by increasing number of resources and productivity based on the analyzed values of the one or more factors affecting test execution.

9. A computer-implemented method for efficiently predicting software testing schedule of one or more applications, via program instructions stored in a memory and executed by a programmed microprocessor, the computer-implemented method comprising:

creating a base execution plan for software testing of an application;

receiving and analyzing values of one or more factors affecting test execution;

receiving data related to test execution from one or more test management tools;

modifying the created base execution plan based on the received data related to test execution and the analyzed values of the one or more factors affecting test execution to generate one or more modified execution plans;

simulating one or more scenarios to determine impact on cost and resources required for executing the software testing of the one or more applications; and determining stability of the application at one or more stages of the testing of the application by generating a system stability score, wherein the system stability score is generated based on values of one or more stability and risk factors associated with the application;

wherein the values of the one or more stability and risk factors are determined using the data related to the test execution received from the one or more connected test management tools.

10. The computer-implemented method of claim 9 further comprising the step of generating a graphical representation illustrating deviations of the one or more generated modified execution plans with respect to the base execution plan.

11. The computer-implemented method of claim 9 further comprising step of providing one or more options to one or more users to modify the values of the one or more factors affecting test execution and generating modified execution schedules corresponding to the modified values of the one or more factors.

12. The computer-implemented method of claim 9, wherein the step of creating the base execution plan comprises providing information corresponding to the base execution plan and further wherein the information corresponding to the base execution plan comprises: testing cycles for a project, start date and end date of testing cycles, number of planned resources, number of hours, planned test cases, planned cost and planned burn rate for each of the one or more testing cycles.

13. The computer-implemented method of claim 9, wherein the one or more factors affecting test execution comprise at least: environment downtime, application downtime, delayed code drop, scope changes, defects and retesting.

14. The computer-implemented method of claim 9, wherein the data related to test execution received from the one or more test management tools comprise at least: number of executed cases, number of passed test cases, number of failed test cases, backlog of test cases, number of test cases awaiting execution and information related to defects.

15. The computer-implemented method of claim 9, wherein the one or more modified execution schedules have associated one or more metrics comprising at least one of: cost, productivity, burn rate and resources.

16. The computer-implemented method of claim 9, wherein the one or more modified execution schedules are generated for adhering to the base execution schedule by increasing number of resources and productivity based on the analyzed values of the one or more factors affecting test execution.

17. A computer program product for efficiently predicting software testing schedule of one or more applications, the computer program product comprising:
a non-transitory computer-readable medium having computer-readable program code stored thereon, the computer-readable program code comprising instructions that when executed by a programmed microprocessor, cause the programmed microprocessor to:
create a base execution plan for software testing of an application;
receive and analyze values of one or more factors affecting test execution;
receive data related to test execution from one or more test management tools; and
modify the created base execution plan based on the received data related to test execution and the analyzed values of the one or more factors affecting test execution to generate one or more modified execution plans;
simulate one or more scenarios to determine impact on cost and resources required for executing the software testing of the one or more applications;
determine stability of the application at one or more stages of the testing of the application by generating a system stability score, wherein the system stability score is generated based on values of one or more stability and risk factors associated with the application; and
determine the values of the one or more stability and risk factors using the data related to the test execution received from the one or more connected test management tools.

* * * * *